March 17, 1942.    D. SILVERMAN    2,276,423
RECORDING SYSTEM
Filed Aug. 31, 1939    2 Sheets-Sheet 2
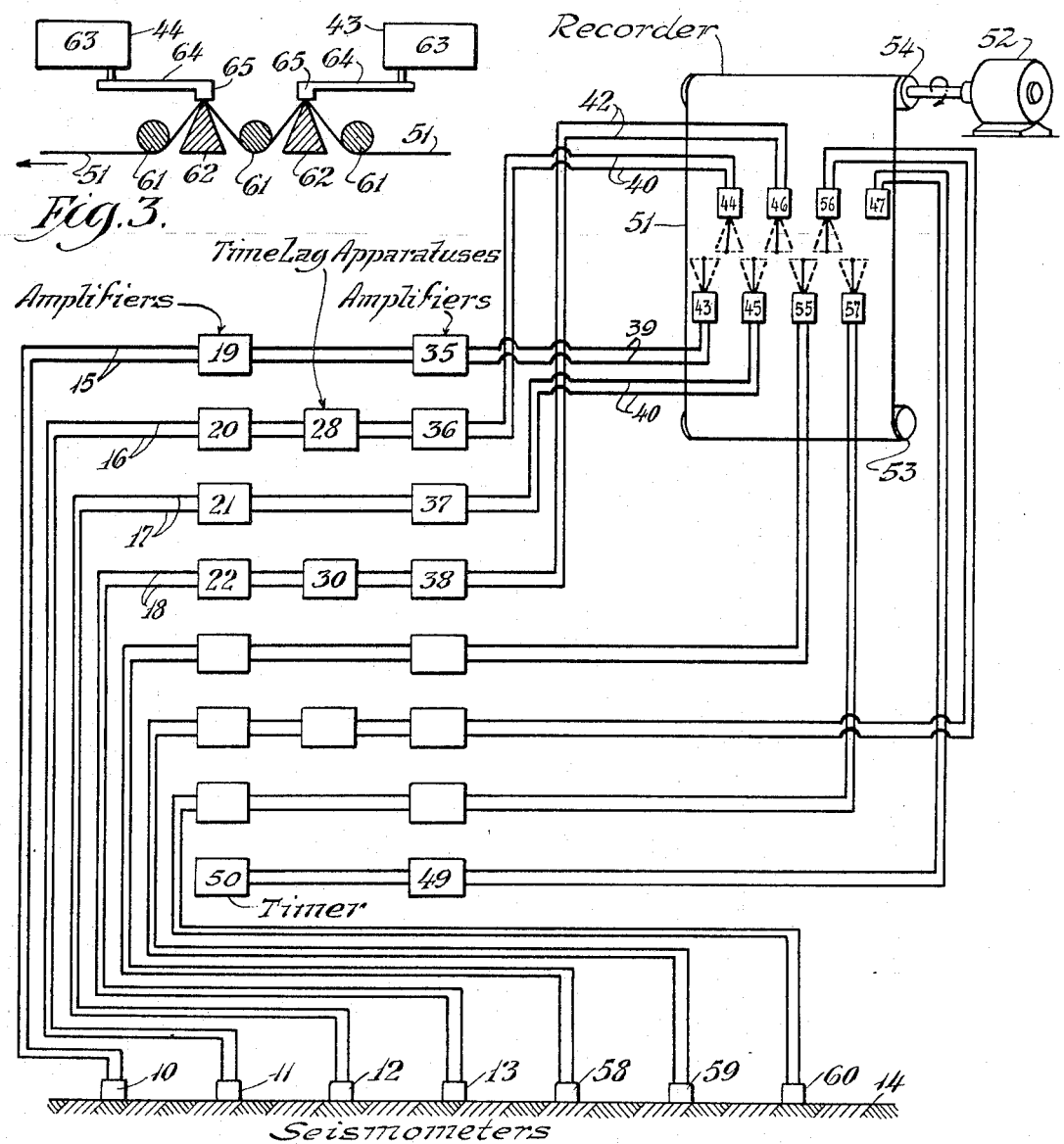
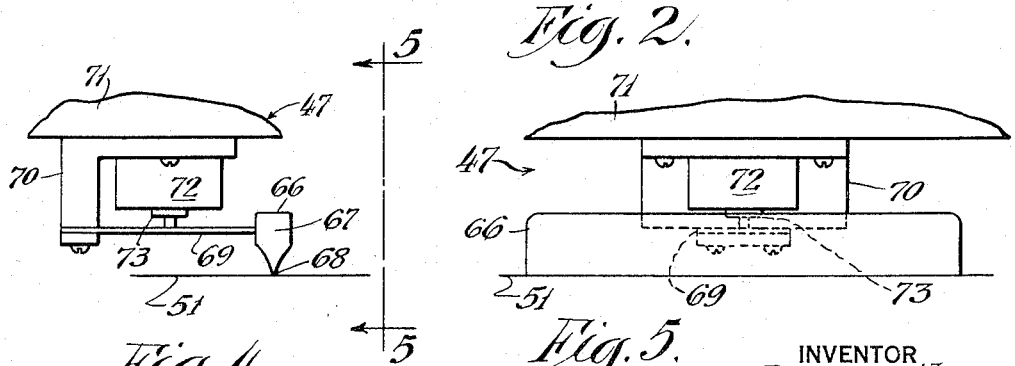
INVENTOR
Daniel Silverman
BY Geo. L. Parkhurst
ATTORNEY Patented Mar. 17, 1942

2,276,423

UNITED STATES PATENT OFFICE 2,276,423

RECORDING SYSTEM

Daniel Silverman, Tulsa, Okla., assignor to Stanolind Oil and Gas Company, Tulsa, Okla., a corporation of Delaware Application August 31, 1939, Serial No. 292,836

8 Claims. (Cl. 234—66)

This invention pertains to the art of seismic exploration and more particularly to an improvement in the type of recording system used in seismic exploration.

It has been customary to record the vibrations picked up in the normal seismic surveying procedure by means of galvanometers actuated by electric amplifiers connected to the seismometers. The recording of the galvanometer deflections is optical, by photographing either the shadow of a moving galvanometer string or by photographing the deflection of a beam of light reflected from a tiny mirror attached to a galvanometer loop. When using either system it has been necessary to move sensitive recording paper past a narrow slit through which the various galvanometers recorded their optical variations. Usually a timing indication is simultaneously marked on the record paper. The record of a shot is cut off from the general reel of sensitive paper at the end of each recording period, and must be developed and fixed before it can be observed. Thus there is always a substantial time lag between the time at which a record is taken and the time at which it can be observed. The sensitive paper used for this work is quite expensive and must be handled with care to be sure that it is not light struck before or after the record is made.

Field procedure is complicated by the fact that developing and fixing chemicals must be prepared at each recording station, that the temperature of the solutions be kept within a relatively narrow range of limits, whereas external temperature varied widely, and finally that a skilled operator must be employed to handle all of the developing work. Often records have been ruined by the use of insufficient or deteriorated chemicals or by faulty technique, caused by the necessity for speed in developing so that the observer could view each record before calling for another explosion.

It is an object of my invention to provide means whereby a durable permanent record of these seismic vibrations can be obtained and viewed immediately after the end of the recording period. It is a further object of my invention to eliminate completely the necessity for the use of photographic recording so that it is possible to do away with a light-tight recorder, portable dark room, developing and fixing chemical solutions and all the attendant apparatus. It is a further object of my invention to eliminate the necessity of employing a skilled technician for developing these records. These and other objects and advantages of my invention will become obvious upon reading the following specification.

In order to illustrate a specific embodiment of my invention, I have included the accompanying drawings which form a part of the specification and should be read in connection therewith.

Figure 2 shows in diagrammatic form an alternative recording system in accordance with my invention.

Figure 3 shows in diagrammatic elevation a detail of a recording system of the type shown in Figure 2.

Figure 4 shows in sectional elevation one type of timing device in accordance with my invention.

Figure 5 is an elevation taken along the line 5—5 of Figure 4.

Figure 1:
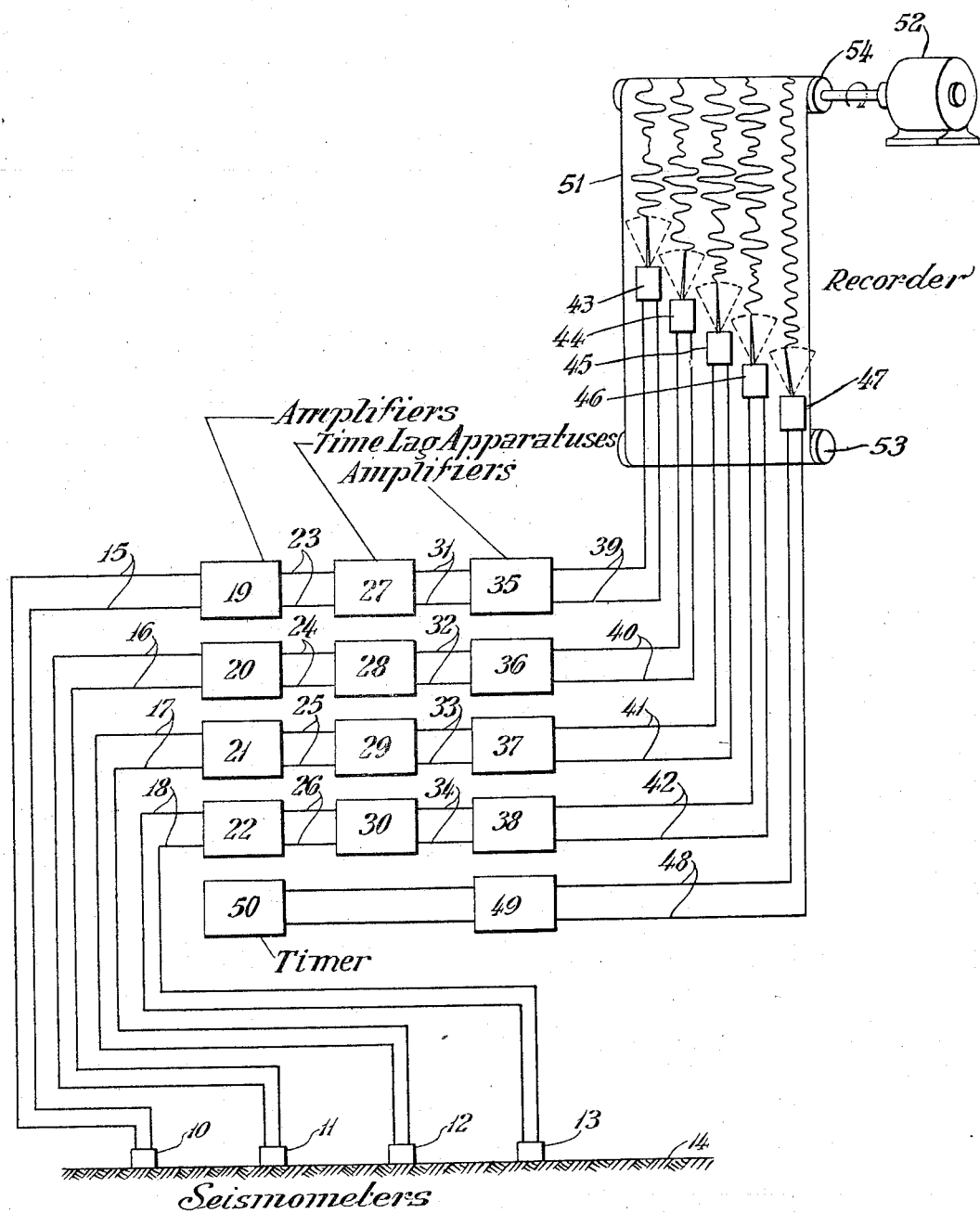
Figure 1 shows in diagrammatic form a simplified recording system in accordance with my invention.

Broadly stated my invention comprises utilizing recorders of the type which draw an inked line on a sheet of paper moving at right angles to the direction of motion of the pen. The deflection of these recording pens is proportional to the voltage applied across the activating elements which in turn is proportional to the amplified voltage output of the various seismometers. One pen is used to record a constant frequency timing pulse so that the speed of the recording paper can be determined at any instant, and so that the relative time between any two events recorded by the pens can be determined accurately. The recorders are so positioned and the associated apparatus so adjusted that in spite of the relatively large size of these recording units, the same number of seismograph traces can be placed on a record of the same width as is now used with optical recording. By the substitution of this type of recording element for the optical galvanometer type used in the past, and by the use of the associated apparatus, I can thus achieve the above objects of my invention.

The operation of the complete equipment can be understood more readily by reference to Figure 1 in which I have shown, in diagrammatic form, four seismometers 10, 11, 12 and 13 resting on the surface of the ground 14. It is understood that this method of recording is not limited to any certain number of instruments. I have shown four for simplicity in drawing. These seismometers are of the electro-mechanical type, translating the mechanical motion impressed upon them into corresponding electrical signals. These seismometers are connected by electric cables 15, 16, 17 and 18 to seismic amplifiers 19, 20, 21, and 22. The signals from the seismometers after amplification are conducted by conductors 23, 24, 25 and 26 to time lag apparatuses 27, 28, 29 and 30. These time lag apparatuses have the function of delaying an electrical signal a definite, pre-determined time interval without introducing appreciable distortion, and can suitably be of any known type, for instance electro-magnetic mechanical devices, electrically long transmission lines, acoustical tubes, or similar apparatus. The time lags introduced into the various signals vary from channel to channel in a definite regulated pattern which, as will be shown below, depends upon the spacing of the recorder pens. The signals now pass to main amplifiers 35, 36, 37 and 38 through conductors 31, 32, 33 and 34, although it will be understood that it is not always essential to use two sets of amplifiers.

Output voltages from these amplifiers energize recording pens 43, 44, 45 and 46 through conductors 49, 40, 41 and 42. It will be noted that the recording pens 43, 44, 45 and 46 are not placed on a straight line as would at first be considered logical. This placing of the pens in echelon is done so that the deflection of each pen may be greater for the same width of strip of recording paper than would be possible if all the pens were placed side by side. The possible maximum movement of each pen arm is shown in dotted lines and it will be seen that the possible pen excursion is about once again as much as would be possible if the pens were placed side by side, since in this latter position it would be possible for the pens to strike each other after having gone through approximately one-half of their total motion. Since this placing of the pens in echelon means that the pens will record at different points on the paper with relation to the timing marks, it is necessary to delay the signals going, for example to pen 43, more than those going to pen 44, for an interval of time equal to the horizontal distance between corresponding points on the pen paths divided by the velocity of the recording paper 51. This holds true throughout the whole system so that, for example, there is a minimum time lag (or none at all) in the system 30 actuating pen 46, an additional time lag $t$ associated with the system operating pen 45, a time lag $2t$ associated with pen 44 and a time lag $3t$ associated with pen 43. By this means the resultant record will have events occurring simultaneously at seismometers 10, 11, 12 and 13, recorded in horizontal alignment (as shown) on the recording paper, the lags in the various time lag mechanisms compensating for the mechanical lags in the recording system due to the spacing of the recording units.

In order to determine the relative differences in time between events on the record strip 51, it is necessary to place timing marks on paper 51. This may be accomplished, for example, by using another pen 47 actuated through line 48 from main amplifier 49, which in turn is actuated by timing system 50. This timing system 50 may be a very stable electric oscillator putting out a constant frequency wave such as is shown in Figure 1. By measuring the distance along the record between any two events and comparing this with the associated timing marks, it is possible to compute with sufficient exactitude the elapsed time between the events. Other sources of time pulses can be used.

Record paper 51 is drawn under the pens by a mechanism which may be a constant speed motor 52 which unwinds the record strip from a lower reel 53 and rewinds it upon an upper reel 54. It is obvious from this description that as soon as the record is complete it can be removed and observed without any need of further processing.

I have found that the inertia present in the pen arm of the average pen-type recorder is so great that it would require far too great power to drive it at the frequency involved (up to about 90 cycles) to allow such a recorder to be used. However, there are certain systems now on the market, for example, a unit utilizing a piezoelectric crystal for the actuating mechanism in which the natural frequency of the system is sufficiently high to allow it to record successfully at frequencies exceeding 90 cycles. Other recorders satisfying the frequency-response requirements can be used equally well.

It is, of course, obvious in the light of my invention that it is possible to position the recording pens in patterns other than the particular one shown in Figure 1. It is immaterial as to what particular pattern is used so long as the pen arm of the various units can execute their desired motions without interfering with each other as is the case if the recorders are not in alignment in a direction normal to the direction of travel of the record strip. For each type of pattern there will be an associated set of time lags which must be introduced. The time lag for each pen element must be adjusted so that events occurring simultaneously at the various seismometers will be recorded in horizontal alignment on the record strip 51.

For instance the pens can be arranged in two or more rows in staggered relationship. In Figure 2 (in which parts corresponding to those of Figure 1 are similarly numbered) pens 44, 46 and 56 are arranged in one row and pens 43, 45, 55 and 57 in another with the pens of one row intermediate between those of the other. Pens 43, 44, 45, 46, 55, 56 and 57 are responsive to seismometers 10, 11, 12, 13, 58, 59 and 60, respectively. However, with this arrangement of pens time lags are not required in the circuits associated with pens 43, 45, 55 and 57 but only in those associated with pens 44, 46 and 56.

The time lag apparatuses 28 and 30 can be adjustable as to value or they can be of fixed value and the positions of the pens can be adjustable in the direction of motion of the recording medium so that the time lag can be made to correspond accurately with the time required for the recording medium to travel between recording points. The rate of motion of the recording medium must, of course, be constant, which can be accomplished by using a motor 52 of the constant speed type and choosing the diameter of reel 54 sufficiently large so that the speed of the recording medium does not change substantially as the recording medium is reeled onto it.

It will be noted that in Figure 1 the motion of the pen point is shown as arcuate while in Figure 2 it is shown as rectilinear. The latter is preferable from the standpoint of interpreting the records but is more difficult so far as instrument design is concerned. However, it can be accomplished in various ways, for instance as shown in Figure 3 where pens 43 and 44 of Figure 2 are shown in elevation. The paper or other recording medium 51 is drawn under rollers 61 and over triangular ridges 62. The rollers and ridges extend across the entire width of recording medium.

Pens 43 and 44 include driving motors 63 which are actuated by the seismometers through the amplifier circuits of Figure 2. These driving motors may be, for instance, of the coil type or preferably of the crystal type. The motors drive arms 64 which carry the actual recording pens 65. The bottom faces of pens 65 are supplied with ink or are otherwise adapted to make records on paper 51 as it passes over ridges 62. Although arms 64 move arcuately the pen faces are broad enough so that throughout their travel they contact the paper passing over ridges 62 and thus give, in effect, straight line motion of the recording point.

Instead of using a pen to make a timing indication as in Figure 1, a timing indicator which makes marks across the entire record is preferable. Such a device 47 is shown in Figures 4 and 5. In these figures a marker bar 66 extends across the record. This bar includes an ink reservoir 67 and, at the bottom, a pen 68. The bar is supported by spring 69 from bracket 70 attached to overhead support 71. The bracket carries a permanent magnet 72 which cooperates with coil 73 carried by spring 69 in the same manner as a voice coil cooperates with a marget assembly in a dynamic type loud speaker. The coil and magnet make up the dynamic driving element for marker bar 66. Coil 73 is supplied with uniformly recurrent current pulses (Figure 2) through amplifier 49 by timer 50 which can be any source of uniformly recurrent current pulses, for instance the familiar type controlled by a tuning fork. Pen 68 is thus brought into contact with the paper or other recording medium 51 periodically, for instance every hundredth of a second, and at such times makes a timing mark extending across the record.

While this recording system is particularly adapted for use in seismic surveying it will be apparent that it has other uses in recording pluralities of electrical signals from sources other than seismometers. In general while I have described my invention largely in connection with certain specific embodiments thereof, it is to be understood that these are by way of illustration and not by way of limitation and I mean to be restricted only to the scope of the appended claims.

I claim:

1. A recording system for a plurality of electrical signals to be recorded as a plurality of indicia on a moving record strip so that the records of signals occurring simultaneously are aligned with each other, which comprises a plurality of time lag elements adapted to delay the transmission of various of said signals and a plurality of record drawing elements cooperating with said record strip and being constructed and arranged to record said indicia on said record strip, said record drawing elements being adapted for movement in a direction normal to the direction of motion of said strip, the width of said record strip on which said signals are to be recorded being less than the aggregate effective width of said record drawing elements, said record drawing elements being arranged so that they contact said record strip at points spaced from each other by distances measured in the direction of motion of said record strip, said time lag elements being constructed and arranged to produce displacements of said indicia longitudinally of said record strip equal and opposite to the displacements caused by the aforementioned arrangement of said record drawing elements whereby each delayed signal transmitted to a dis-aligned record drawing element is delayed an amount corresponding to the amount of displacement of that particular record drawing element.

2. A recording system for a plurality of electrical signals to be recorded as a plurality of indicia on a moving record strip so that the records of signals occurring simultaneously are aligned with each other, which comprises a plurality of graduated time lag elements adapted to delay the transmission of various of said signals, and a plurality of record drawing elements electrically associated therewith said record drawing elements being adapted for movement in a direction normal to the direction of motion of said strip, the width of said record strip on which said signals are to be recorded being less than the aggregate effective width of said plurality of record drawing elements, said record drawing elements being arranged in echelon, said graduated time lag elements being constructed and arranged to produce displacements of said indicia longitudinally of said record strip equal and opposite to the displacements caused by the echeloned arrangement of said record drawing elements whereby each delayed signal transmitted to a dis-aligned record drawing element is delayed an amount corresponding to the amount of displacement of that particular record drawing element.

3. A recording system for a plurality of electrical signals to be recorded as a plurality of indicia on a moving record strip so that the records of signals occurring simultaneously are aligned with each other which comprises a plurality of time lag elements adapted to delay the transmission of various of said signals and a plurality of record drawing elements, at least some of said record drawing elements being constructed and arranged to record said delayed signals as indicia on said record strip, the width of said record strip on which said signals are to be recorded being less than the aggregate effective width of said plurality of record drawing elements, said plurality of record drawing elements being arranged in a plurality of lines in staggered relationship with each other, said time lag elements being constructed and arranged to produce displacements of said indicia equal and opposite to the displacements of said indicia caused by the staggered relationship of said record drawing elements constructed and arranged to record delayed signals, thereby compensating for the differences in position of said plurality of record drawing elements measured in the direction of motion of said record strip.

4. A recording system for a plurality of electrical signals to be recorded as a plurality of indicia on a common record strip so that the records of signals occurring simultaneously are recorded with the indicia arranged in a line normal to the direction of travel of the record strip, comprising a record strip, means for moving said record strip, a plurality of time lag systems constructed and arranged to delay at least some of said plurality of electrical signals, and a plurality of mechanical record drawing elements contacting said record strip, at least some of said record drawing elements being responsive to said electrical signals delayed by said plurality of time lag systems, the width of said record strip on which said signals are to be recorded being less than the aggregate effective width of said plurality of record drawing elements, said plurality of mechanical record drawing elements being spaced from each other by distances measured in the direction of motion of said record strip and disposed so close together measured in a direction normal to the direction of motion of said strip that they would interfere mechanically with each other if not arranged in said spaced position, said time lag elements being adapted to create time lags of such magnitude that the difference in time lag for adjacent record drawing elements constructed and arranged to record said delayed signals is the time required for said record strip to travel the distance between adjacent record drawing elements measured in the direction of motion of said record strip.

5. A recording system for a plurality of electrical signals to be recorded as a plurality of indicia on a common record strip with the records in alignment across said record strip so that signals occurring simultaneously are recorded with the indicia arranged in a line normal to the direction of travel of said record strip, comprising a record strip, means for moving said record strip, a plurality of graduated time lag systems constructed and arranged to delay at least some of said plurality of electrical signals, and a plurality of mechanical record drawing elements responsive to said plurality of electrical signals delayed by said plurality of graduated time lag systems, said plurality of mechanical record drawing elements being arranged in echelon and disposed so close together measured in a direction normal to the direction of motion of said record strip that they would interfere mechanically with each other if not arranged in echelon, said graduated time lag elements being adapted to create time lags of such relative magnitude that the difference in time lag for adjacent record drawing elements is the time required for said record strip to travel the distance between adjacent record drawing elements measured in the direction of motion of said record strip.

6. A recording system for a plurality of electrical signals generated by a plurality of seismometers, which electrical signals are to be recorded as a plurality of indicia on a common record strip with the records in alignment across said strip so that signals occurring simultaneously are recorded with the indicia arranged in a line normal to the direction of travel of the record strip, comprising a record strip, means for moving said record strip at constant speed, a plurality of time lag system constructed and arranged to delay at least some of said plurality of electrical signals, and a plurality of pen-type recorder elements responsive to said electrical signals, at least some of which have been delayed by said plurality of time lag systems, the width of said record strip on which said signals are to be recorded being less than the aggregate effective width of said recorder elements, said pen-type recorder elements being so constructed and arranged that at least some of them are separated by distances measured in the direction of motion of said record strip and disposed so close together measured in the direction normal to the direction of motion of said record strip that they would interfere with each other if not separated by distances measured in a direction normal to the direction of motion of said record strip, said time lag elements being adapted to create time lags of such magnitudes that the difference in time lag for adjacent recorder elements constructed and arranged to record said delayed signals is the time required for said record strip to travel the distance between adjacent recorder elements measured in the direction of motion of said record strip.

7. A recording system for a plurality of electrical signals generated by a plurality of seismometers, which electrical signals are to be recorded as a plurality of indicia on a common record strip with the records in alignment across said strip so that signals occurring simultaneously are recorded with the indicia arranged in a line normal to the direction of travel of the record strip, comprising a record strip, means for moving said record strip, a plurality of graduated time lag systems constructed and arranged to delay at least some of said plurality of electrical signals, and a plurality of pen-type recorder elements responsive to said electrical signals, at least some of which have been delayed by said plurality of graduated time lag systems, the width of said record strip on which said signals are to be recorded being less than the aggregate effective width of said plurality of recorder elements, said pen-type recorder elements being arranged in echelon and disposed so close together measured in a direction normal to the direction of motion of said strip that they would interfere with each other if not arranged in echelon, said graduated time lag elements being adapted to create time lags of such relative magnitudes that the difference in time lag, for adjacent recorder elements constructed and arranged to record said delayed signals is the time required for said record strip to travel the distance between adjacent recorder elements measured in the direction of motion of said record strip.

8. A recording system for a plurality of electrical signals generated by a plurality of seismometers, which electrical signals are to be recorded as a plurality of indicia on a common record strip with the records in alignment across said strip so that signals occurring simultaneously are recorded with the indicia arranged in a line normal to the direction of travel of the record strip, comprising a record strip, means for moving said record strip, a plurality of time lag systems constructed and arranged to delay at least some of said plurality of electrical signals, and a plurality of pen-type recorder elements responsive to said electrical signals, at least some of which have been delayed by said plurality of time lag systems, the width of said record strip on which said signals are to be recorded being less than the aggregate effective width of said plurality of recorder elements, said pen-type recorder elements being arranged in staggered relationship in a plurality of lines, said time lag elements being adapted to create time lags of such relative magnitudes that the difference in time lag for a given pair of recorder elements is the time required for said record strip to travel the distance between the recorder elements of said pair measured in the direction of motion of said record strip.

DANIEL SILVERMAN.